(12) United States Patent
Sung

(10) Patent No.: US 10,845,759 B2
(45) Date of Patent: Nov. 24, 2020

(54) SNAPSHOT OPTICAL TOMOGRAPHY SYSTEM AND METHOD OF ACQUIRING AN IMAGE WITH THE SYSTEM

(71) Applicant: UWM Research Foundation, Inc., Milwaukee, WI (US)

(72) Inventor: Yongjin Sung, Milwaukee, WI (US)

(73) Assignee: UWM Research Foundation, Inc., Milwaukee, WI (US)

( * ) Notice: Subject to any disclaimer, the term of this patent is extended or adjusted under 35 U.S.C. 154(b) by 151 days.

(21) Appl. No.: 16/092,256

(22) PCT Filed: May 4, 2017

(86) PCT No.: PCT/US2017/031128
§ 371 (c)(1),
(2) Date: Oct. 9, 2018

(87) PCT Pub. No.: WO2017/192896
PCT Pub. Date: Nov. 9, 2017

(65) Prior Publication Data
US 2019/0163132 A1 May 30, 2019

Related U.S. Application Data

(60) Provisional application No. 62/332,663, filed on May 6, 2016.

(51) Int. Cl.
*G01J 3/45* (2006.01)
*G03H 1/04* (2006.01)
(Continued)

(52) U.S. Cl.
CPC .............. *G03H 1/0443* (2013.01); *G01J 3/45* (2013.01); *G02B 21/14* (2013.01); *G02B 21/367* (2013.01);
(Continued)

(58) Field of Classification Search
CPC . G01B 9/02091; G06T 11/003; G06T 11/006; A61B 5/0033; A61B 5/0059;
(Continued)

(56) References Cited

U.S. PATENT DOCUMENTS 8,848,199 B2   9/2014 Choi et al.
2004/0263859 A1 12/2004 Chang et al.
(Continued)

OTHER PUBLICATIONS

Andersson H, et al., Microfluidic devices for cellomics: a review. Sensors and actuators B: Chemical. 2003;92(3):315-25.
(Continued)

*Primary Examiner* — Rebecca C Bryant
(74) *Attorney, Agent, or Firm* — Michael Best & Friedrich LLP

(57) ABSTRACT

This disclosure discloses a method of creating a three-dimensional image of a sample using snapshot optical tomography. The method includes generating a plurality of beams incident on the sample simultaneously, acquiring a field image at a plane not conjugate to the sample plane using off-axis digital holography, extracting amplitude data and phase data for the field image, restoring the sharpness by backpropagating the field image using the extracted amplitude and phase data, acquiring a background image, extracting amplitude data and phase data for the background image, and reconstructing a three-dimensional image of the sample with the backpropagated field image and the background image. The method also includes arranging more than one imaging chains to remove the missing angle artefacts in optical tomography. Also disclosed are systems for performing the method.

18 Claims, 20 Drawing Sheets

(51) Int. Cl.
*G03H 1/08* (2006.01)
*G02B 21/36* (2006.01)
*G02B 21/14* (2006.01)
*G02B 21/00* (2006.01)
*G01J 3/28* (2006.01)

(52) U.S. Cl.
CPC .... *G03H 1/0866* (2013.01); *G01J 2003/2826* (2013.01); *G02B 21/0056* (2013.01); *G02B 21/0088* (2013.01); *G03H 2001/046* (2013.01); *G03H 2001/0445* (2013.01); *G03H 2001/0471* (2013.01)

(58) Field of Classification Search
CPC .. A61B 5/0073; G02B 26/106; G03H 1/0402; G03H 1/0404; G03H 1/0443
See application file for complete search history.

(56) References Cited

U.S. PATENT DOCUMENTS

| | | | |
|---|---|---|---|
| 2005/0068612 A1* | 3/2005 | Wilson | H01S 3/1003 359/337 |
| 2007/0057211 A1* | 3/2007 | Bahlman | G01N 21/6486 250/584 |
| 2008/0266655 A1 | 10/2008 | Levoy et al. | |
| 2012/0080411 A1 | 4/2012 | Mizuyama et al. | |
| 2014/0263963 A1 | 9/2014 | Broxton et al. | |
| 2014/0313576 A1* | 10/2014 | Uhl | G02B 27/58 359/385 |
| 2014/0333929 A1 | 11/2014 | Sung et al. | |
| 2016/0164261 A1* | 6/2016 | Warren | H01S 5/18388 348/164 |

OTHER PUBLICATIONS

Barer R, et al., Refractive index of concentrated protein solutions. Nature. 1954;173(4409):821.

Barer R., Interference microscopy and mass determination. Nature. 1952;169(4296):366-7.

Bon P, et al., Quadriwave lateral shearing interferometry for quantitative phase microscopy of living cells. Optics express. 2009;17(15):13080-94.

Born M, et al., Principles of Optics: Electromagnetic Theory of Propagation, Interference and Diffraction of Light: Cambridge University Press; 1999.

Charrière F, et al., Cell refractive index tomography by digital holographic microscopy. Optics Letters. 2006;31(2):178-80.

Choi W, et al., Tomographic phase microscopy. Nature Methods. 2007;4(9):717-9.

Creath K., Phase-measurement interferometry techniques. Progress in optics. 1988;26(26):349-93.

Devaney A., Inverse-scattering theory within the Rytov approximation. Optics Letters. 1981;6(8):374-6.

Fu D, et al., Quantitative dispersion microscopy. Biomed Opt Express. 2010;1(2):347.

Herzenberg et al., Fluorescence-activated cell sorting. Sci Am. 1976;234(3):108-17.

Ikeda T, et al., Hilbert phase microscopy for investigating fast dynamics in transparent systems. Optics Letters. 2005;30(10):1165-7.

Iwai H, et al., Quantitative phase imaging using actively stabilized phase-shifting low-coherence interferometry. Optics Letters. 2004;29(20):2399-401.

Johnston C, et al, Implementing image processing algorithms on FPGAs. Proceedings of the Eleventh Electronics New Zealand Conference, ENZCon'04; 2004.

Lauer V., New approach to optical diffraction tomography yielding a vector equation of diffraction tomography and a novel tomographic microscope. Journal of Microscopy. 2002;205(2):165-76.

Lim J, et al., Comparative study of iterative reconstruction algorithms for missing cone problems in optical diffraction tomography. Optics express. 2015;23(13):16933-48.

Platt BC, et al., History and principles of Shack-Hartmann wavefront sensing. Journal of Refractive Surgery. 2001;17(5):S573-S7.

Popescu G., Quantitative phase imaging of cells and tissues: McGraw Hill Professional; 2011.

Slaney M, et al., Principles of computerized tomographic imaging. SIAM, Philadelphia. 1988.

Streibl N., Phase imaging by the transport equation of intensity. Optics Communications. 1984;49(1):6-10.

Sung Y, et al., Optical diffraction tomography for high resolution live cell imaging. Optics Express. 2009;17(1):266-77.

Sung Y, et al., Stain-Free Quantification of Chromosomes in Live Cells Using Regularized Tomographic Phase Microscopy. PloS one. 2012;7(11):e49502.

Sung Y, et al., Deterministic regularization of three-dimensional optical diffraction tomography. J Opt Soc Am A. 2011;28(8):1562-5.

Sung Y, et al., Three-Dimensional Holographic Refractive-Index Measurement of Continuously Flowing Cells in a Microfluidic Channel, Physical Review Applied, 2014;1:014002.

Teague MR., Deterministic phase retrieval: a Green's function solution. JOSA. 1983;73(11):1434-41.

Waller L, et al., Phase from chromatic aberrations. Optics Express. 2010;18(22):22817-25.

Wolf E., Three-dimensional structure determination of semi-transparent objects from holographic data. Optics Communications. 1969;1(4):153-6.

International Search Report and Written Opinion for Application No. PCT/US2017/031128 dated Sep. 22, 2017 (21 pages).

International Preliminary Report on Patentability for Application No. PCT/US2017/031128 dated Nov. 15, 2018 (8 pages).

* cited by examiner

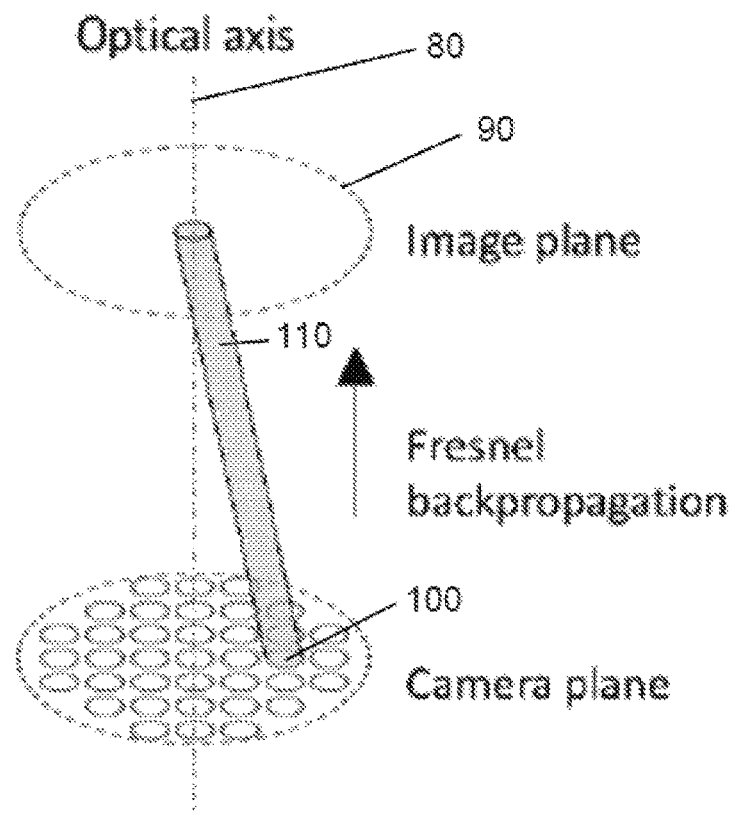
FIG. 6
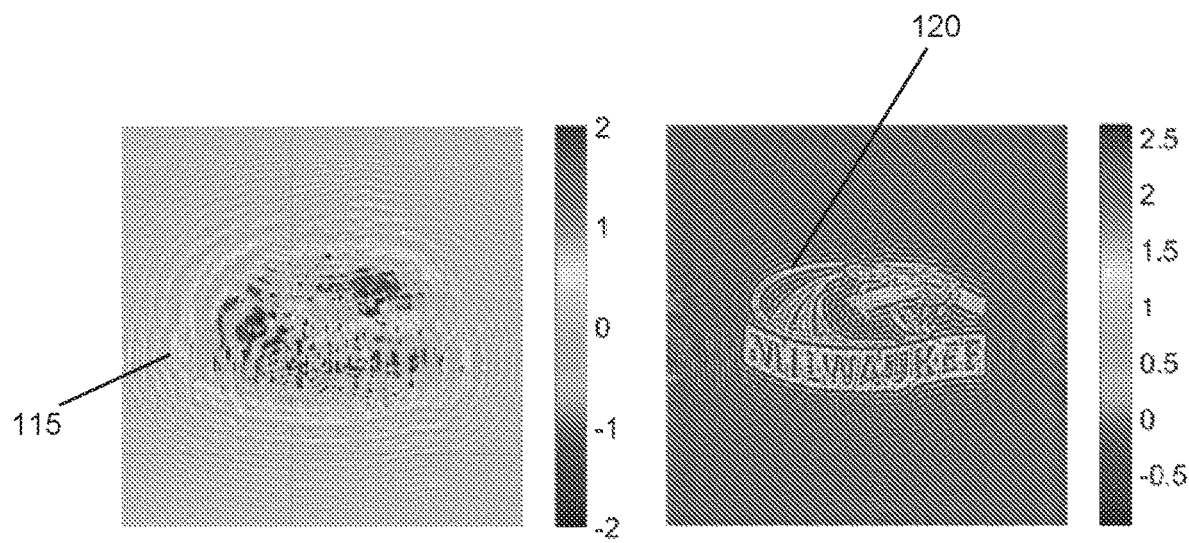
FIG. 7A  FIG. 7B

Cross-section at z=-20μm
Crack is observed
as index discontinuity.

Division asymmetry in eukaryotic cells

SNAPSHOT OPTICAL TOMOGRAPHY SYSTEM AND METHOD OF ACQUIRING AN IMAGE WITH THE SYSTEM

RELATED APPLICATIONS

This patent application is the U.S. national stage entry, under 35 U.S.C. § 371, of international application number PCT/US2017/031128, filed May 4, 2017, which claims the benefit of U.S. Patent Application No. 62/332,663, filed on May 6, 2016, the entire content of each which are incorporated herein by reference.

BACKGROUND

The invention relates to systems and methods to perform three-dimensional (3-D) optical tomography, and more specifically, in some embodiments, digital holographic tomography. The systems and methods may be translated to other imaging modalities.

Optical tomography is a technique providing three-dimensional information of a specimen at a nanometer resolution using ultraviolet, visible, or infrared light. It can provide the complex internal structure of a specimen, and thus is distinct from topographical surface measurement or surface profilometry. Optical tomography in tandem with a variety of fluorescence markers or spectroscopic interrogation methods can also provide the chemical property of a material or the physiological status of a biological specimen.

Digital holographic tomography (DHT), an optical tomography technique recording both the amplitude and phase of light, can measure the complex-valued refractive index map of a specimen in three dimensions. The complex refractive index can be related to the electron density of a material, the mass concentrations of chemicals in a drug and biomolecules in a cell, just to name a few. By using different colors of light, the refractive index measurement can provide the molecular fingerprint of a material in 3D. In principle, digital holographic tomography adopts a collimated beam or a plane wave, which illuminates the sample at different angles. The amplitude and phase of each beam are altered due to the complex refractive index of the sample. Therefore, by recording the complex-valued light fields, called projection images, at different angles of illumination and applying a tomographic reconstruction algorithm, the complex refractive index distribution in three dimensions can be measured. To vary the illumination angles, a single or a pair of galvanometer-mounted scanning mirror is typically used, and the wavefront is measured using interferometry, Shack-Hartman sensor and transport of intensity method.

There are variations of methods that have been proposed for the last couple of decades. A recent invention of a digital holographic tomography system can be applied to continuously flowing samples. The system named three-dimensional holographic imaging flow cytometry (3-D HIFC) flows samples across a line-focused beam and records the angular spectra of the light scattered from the samples while they flow across the beam.

The following references are related to the invention and are incorporated herein by reference.

Hesselink L 1989 Optical tomography Handbook of Flow Visualisation W-J Yang (New York: Hemisphere) ch 20.
Popescu G. Quantitative phase imaging of cells and tissues: McGraw Hill Professional; 2011.
Goodman J. Introduction to Fourier optics: Roberts & Company Publishers; 2005.
Sung Y, Choi W, Fang-Yen C, Badizadegan K, Dasari R, Feld M. Optical diffraction tomography for high resolution live cell imaging. Optics Express. 2009; 17(1):266-77.
Sung Y, Lue N, Hamza B, Martel J, Irimia D, Dasari R R, Choi W, Yaqoob Z, So P. Phys Rev Appl. 2014; 1:014002.
Choi W, Fang-Yen C, Badizadegan K, Oh S, Lue N, Dasari R, et al. Tomographic phase microscopy. Nature Methods. 2007; 4(9):717-9.
Choi W, Dasari R R, Fang-Yen C, Feld M S. Tomographic phase microscopy. U.S. Pat. No. 8,848,199 B2.
Lauer V. New approach to optical diffraction tomography yielding a vector equation of diffraction tomography and a novel tomographic microscope. Journal of Microscopy. 2002; 205(2):165-76.
Charrière F, Marian A, Montfort F, Kuehn J, Colomb T, Cuche E, et al. Cell refractive index tomography by digital holographic microscopy. Optics Letters. 2006; 31(2):178-80.
Born M, Wolf E. Principles of Optics: Electromagnetic Theory of Propagation, Interference and Diffraction of Light: Cambridge University Press; 1999.
Barer R. Interference microscopy and mass determination. Nature. 1952; 169(4296):366-7.
Barer R, Tkaczyk S. Refractive index of concentrated protein solutions. Nature. 1954; 173(4409):821.
Sung Y, Choi W, Lue N, Dasari R R, Yaqoob Z. Stain-Free Quantification of Chromosomes in Live Cells Using Regularized Tomographic Phase Microscopy. PloS one. 2012; 7(11):e49502.
Fu D, Choi W, Sung Y, Yaqoob Z, Dasari R R, Feld M. Quantitative dispersion microscopy. Biomed Opt Express. 2010; 1(2):347.
Creath K. Phase-measurement interferometry techniques. Progress in optics. 1988; 26(26):349-93.
Platt B C, Shack R. History and principles of Shack-Hartmann wavefront sensing. Journal of Refractive Surgery. 2001; 17(5):S573-57.
Streibl N. Phase imaging by the transport equation of intensity. Optics Communications. 1984; 49(1):6-10.
Teague M R. Deterministic phase retrieval: a Green's function solution. JOSA. 1983; 73(11):1434-41.
Iwai H, Fang-Yen C, Popescu G, Wax A, Badizadegan K, Dasari R R, et al. Quantitative phase imaging using actively stabilized phase-shifting low-coherence interferometry. Optics Letters. 2004; 29(20):2399-401.
Ikeda T, Popescu G, Dasari R R, Feld M S. Hilbert phase microscopy for investigating fast dynamics in transparent systems. Optics Letters. 2005; 30(10):1165-7.
Waller L, Kou S S, Sheppard C J R, Barbastathis G. Phase from chromatic aberrations. Optics Express. 2010; 18(22):22817-25.
Bon P, Maucort G, Wattellier B, Monneret S. Quadriwave lateral shearing interferometry for quantitative phase microscopy of living cells. Optics express. 2009; 17(15): 13080-94.
Sung Y, Lue N, Yaqoob Z, Dasari R, So P T. 3-d holographic imaging flow cytometry. Google Patents; 2014.
Sung Y, Dasari R R. Deterministic regularization of three-dimensional optical diffraction tomography. J Opt Soc Am A. 2011; 28(8):1562-5.
Lim J, Lee K, Jin K H, Shin S, Lee S, Park Y, et al. Comparative study of iterative reconstruction algorithms for missing cone problems in optical diffraction tomography. Optics express. 2015; 23(13):16933-48.
Slaney M, Kak A. Principles of computerized tomographic imaging. SIAM, Philadelphia. 1988.

Wolf E. Three-dimensional structure determination of semi-transparent objects from holographic data. Optics Communications. 1969; 1(4):153-6.

Devaney A. Inverse-scattering theory within the Rytov approximation. Optics Letters. 1981; 6(8):374-6.

Johnston C, Gribbon K, Bailey D, editors. Implementing image processing algorithms on FPGAs. Proceedings of the Eleventh Electronics New Zealand Conference, ENZCon'04; 2004.

Herzenberg L A, Sweet R G, Herzenberg L A. Fluorescence-activated cell sorting. Sci Am. 1976; 234(3):108-17.

Andersson H, Van den Berg A. Microfluidic devices for cellomics: a review. Sensors and actuators B: Chemical. 2003; 92(3):315-25.

SUMMARY

As with other optical tomography techniques, digital holographic tomography has two drawbacks: low imaging throughput due to the need for collecting several hundred projection images for each tomogram; and poor axial resolution and inaccurate refractive index value due to insufficient collection of scattering data, so-called missing-angle problem. See Sung Y, Dasari R R. Deterministic regularization of three-dimensional optical diffraction tomography. J Opt Soc Am A. 2011; 28(8):1562-5. Firstly, a couple of hundred projection images are typically recorded for each tomogram while rotating a pair of source and detector, or rotating the specimen. The data acquisition time is given by the summation of the time for recording the projection images and changing the angle of illumination, which amounts to a fraction of a second at best. Image artefacts due to the motion of the imaged specimen or its structural change during the data acquisition are very hard to correct in the post-processing step. In addition, installing a scanning mechanism increases the complexity and footprint of the system as well as manufacturing and service cost, which have prohibited widespread use of optical tomography in research and development environment. Therefore, there is a need for a three-dimensional optical tomography technique that does not rely on a scanning mechanism.

Secondly, the amount of collected information in optical tomography is limited by the numerical aperture of condenser and objective lenses. The missing information or the uncollected scattering field generates a lot of artefacts, called missing-angle artefacts, in the reconstructed tomogram, the most serious of which are the elongation of tomogram in the optical axis direction and the underestimation of refractive index value. A portion of the missing information can be retrieved using a prior knowledge about the specimen (e.g., the positivity constraint, piecewise-smoothness) in a process called regularization. See Lim J, Lee K, Jin K H, Shin S, Lee S, Park Y, et al.; and Sung Y, Dasari R R. Comparative study of iterative reconstruction algorithms for missing cone problems in optical diffraction tomography. Optics express. 2015; 23(13):16933-48. However, regularization usually introduces other artefacts or produces a result subject to change depending on the choice of regularization parameters. However, regularization does not work well when the information is missing for an extended range of angles as in the case of digital holographic tomography.

In embodiments, the invention provides systems and methods to record the three-dimensional complex refractive index value of a specimen in a snapshot. Snapshot multidimensional imaging has been an active research topic in hyperspectral imaging, imaging of a two-dimensional scene at different wavelength, or color. Typically, a broadband source is adopted to generate a spectrally-multiplexed image. Utilizing the wavelength dependence of light-propagation properties (e.g., absorption, phase delay, refraction and diffraction), snapshot hyperspectral imaging disperses individual color images in the broadband mixture and record them in a single shot. In contrast, optical tomography requires acquiring a series of two-dimensional projection images at different angles of illumination and typically at a single wavelength; thus, the strategies dispersing a multiplexed image based on the wavelength cannot be used for optical tomography.

Aspects of the invention relate to systems and methods that allow performing three-dimensional optical tomography. Specifically, the systems and methods record a multitude of projection images in a single instance by using angular multiplexing of illumination and light field imaging. The acquired projection images can be used to reconstruct the three-dimensional refractive index map of a sample, which provides the sample's structural and chemical information. The proposed systems and methods also allow capturing the three-dimensional tomogram without motion artifact and missing angle artefact, both of which are common in existing optical tomography techniques.

In some aspects, the invention provides systems and methods that allow snapshot optical tomography using angular multiplexing of illumination and defocused light-field imaging. In particular, a micro-lens array generates a multitude of coherent beams, each of which illuminates the sample at a different angle. The sample illuminated by multiple beams produces two-dimensional projection images overlapping at the image plane, a plane conjugate to the sample plane. By placing the camera at a distance from the imaging plane, the different angular components are separated at the cost of image sharpness. Recording the light field, both the amplitude and phase, at the defocused camera plane and applying the Fresnel propagation kernel, the sharpness of the two-dimensional projection images can be restored.

In some additional aspects, the invention involves systems and methods for performing digital holographic tomography without the missing angle artefacts. In principle, two optical trains are arranged in a unique way (e.g., orthogonally) to capture the scattering field without missing angles. Each train records a set of projection images, and one data set contains the information complementary to the other data set about the sample. Combining the two set of data in the three-dimensional spatial frequency space, one can produce a three-dimensional refractive index map free from the missing angle artefacts.

Aspects of the invention relate to systems and methods that allow performing three-dimensional optical tomography in a flow cytometry configuration. Specifically, the systems and methods record the three-dimensional complex refractive index maps of single cells continuously flowing in a small channel at high speed. The snapshot tomography allows three-dimensional imaging of flowing cells at the speed only limited by the camera frame rate. Implementing image processing and tomographic reconstruction algorithms on a field-programmable gate array (FPGA), acquired images can be processed, tomograms reconstructed and important parameters extracted in real time. The extracted parameters can be fed back into an actuator to allow cell sorting based on the measured refractive index map.

In one embodiment, the invention provides a snapshot optical tomography system for capturing an image of a sample. The system includes a light source, a microlens array coupled to the light source to provide a first beam having a first path and a second beam having a second path. The second path is different from the first path. The system further includes a condenser lens to focus the first beam and the second beam on the sample at a sample plane from different angles of illumination, a second lens to focus the first beam and the second beam at an image plane different from the sample plane, and a camera to acquire a first image associated with the first beam and acquire a second image associated with the second beam. The camera acquires the first image and the second image at a camera plane. The camera plane is different from the image plane. The system also has a processor and memory to reconstruct a reconstructed image of the sample using the first image and the second image by backpropagating the first image and backpropagating the second image to the image plane.

In another embodiment, the invention provides a method of creating a three-dimensional image of a sample using snapshot optical tomography. The method includes generating a plurality of beams at the sample plane on the sample at different angles of illumination, and acquiring a plurality of field images at a camera plane using off-axis digital holography. The camera plane is offset from an image plane conjugate to the sample plane. Each field image of the plurality of field images is associated with a respective beam of the plurality of beams. The method further includes extracting amplitude data and phase data for the acquired plurality of field images, backpropagating the plurality of field images using the amplitude data and the phase data, acquiring a background image, extracting amplitude data and phase data for the background image, and reconstructing a three-dimensional image of the sample with the backpropagated plurality of field images and the background image.

In yet another embodiment, the invention provides a snapshot optical tomography system for capturing an image of a sample. The system includes a light source to provide a beam, a first microlens array coupled to the light source and a second microlens array coupled to the light source. The first microlens array has a first axis, and provides a first plurality of beams with a first plurality of distinct paths. The second microlens array has a second axis, and provides a second plurality of beams with a second plurality of distinct paths. The second axis is substantially orthogonal to the first axis. The system further includes a camera to acquire a first image associated with the first plurality of beams, and to acquire a second image associated with the second plurality of beams. The camera acquires the first image and the second image at a camera plane. The camera plane is different from an image plane. The system also has a processor and memory to reconstruct a reconstructed image of the sample using the first image and the second image by backpropagating the first image and backpropagating the second image to the image plane.

BRIEF DESCRIPTION OF THE DRAWINGS

FIG. 6 is a side view representing backpropagation of a light field.

FIG. 7A is an exemplary image recorded at a defocused camera plane.

FIG. 7B is an exemplary image acquired by Fresnel backpropagation.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Additionally, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality.

Figure 1:
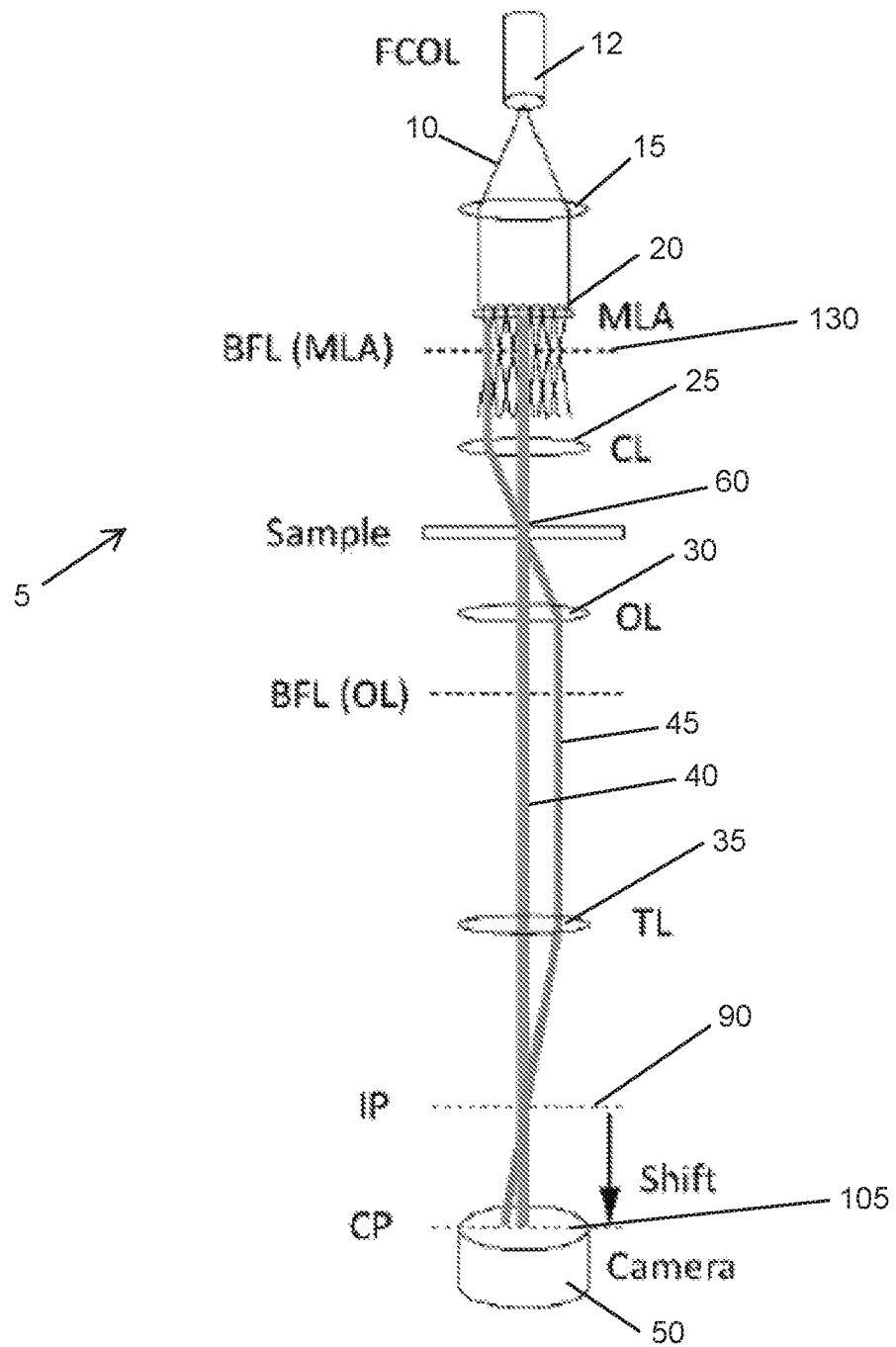
FIG. 1 is a schematic diagram of a proposed exemplary snapshot optical tomography system incorporating aspects of the invention.
Figure 2:
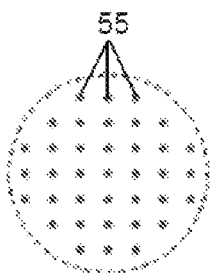
FIG. 2 is sectional view of a light intensity distribution at a back focal plane of a micro-lens array.
Figure 3:
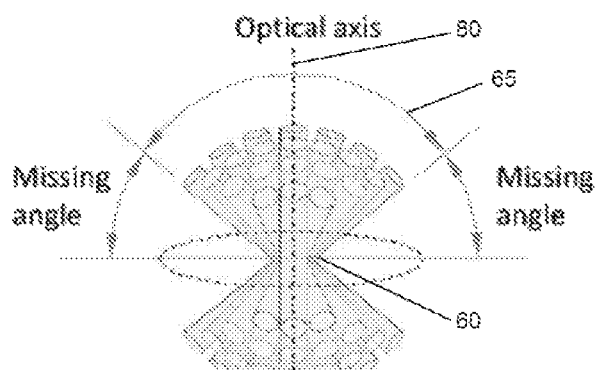
FIG. 3 is a perspective view of a light intensity distribution at a sample plane.
Figure 4:
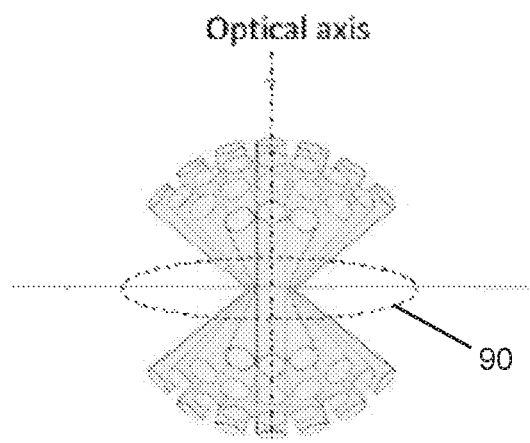
FIG. 4 is a perspective view of a light intensity distribution at an image plane.
Figure 5:
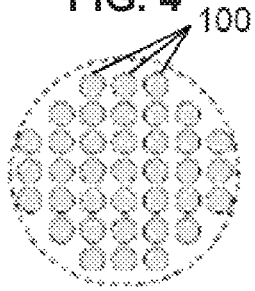
FIG. 5 is sectional view of a light intensity distribution at a camera plane.

FIG. 1 shows a schematic diagram of an exemplary system 5 incorporating the invention. The exemplary system 5 utilizes a modified Mach-Zehnder interferometry, also called off-axis digital holography, to record the light field at the camera plane. Alternatively, the light field can also be recorded using a variety of other methods such as a Shack-Hartmann sensor and transport of intensity method. For FIG. 1, a laser beam 10 is expanded and collimated by a beam expander, and a beam splitter splits the beam into two: one propagating through the sample and the other in the free space. More specifically, the system 5 includes a fiber collimator (FCOL) 12, a beam expander 15, a micro-lens array (MLA) 20, a condenser lens (CL) 25, an objective lens (OL) 30, and a tube lens (TL) 35. Two representative beam paths 40 and 45 are shown in FIG. 1 from the micro-lens array 20 to a camera 50. The micro-lens array 20 in the sample beam path generates a two-dimensional array of focused beams 55 (FIG. 2) at the back focal plane of the micro-lens array 20 or the front focal plane of the condenser lens 25. The focused beam 55 generated by each lenslet is collimated by the condenser lens 25 and illuminates a sample 60 at a different angle. The angle of each beam at the sample plane is determined by the distance between the optical axis 80 and the center of the lenslet that generated the beam. The amplitude and phase of each collimated beam change while it passes through the sample 60. After the sample 60, the objective lens 30 and the tube lens 35 in a 4-f configuration magnify and relay the beam to the image plane 90. The 4-f configuration means that the sample is placed at the front focal plane of the objective lens 30; that the distance between the objective lens 30 and the tube lens 35 is the sum of their focal lengths; and that the image plane 90 is at the back focal plane of the tube lens 35. In the 4-f configuration, the image plane 90 is conjugate to the sample plane. The projection images 100 have the highest sharpness at the image plane 90, but they converge to the optical axis 80 and spatially overlap in the image plane 90. It would be very difficult to demultiplex the projection images 100 in postprocessing. The beams carrying the projection images are incident onto the image plane 90 at different angles and the distance between the images increases as the beams propagate further downstream. Thus, on one hand, placing the camera 50 at a far enough distance from the image plane 90, the system 5 can acquire all the projecting images 100 all at once without any overlap (FIG. 5). On the other hand, the images 100 will be blurred because the camera plane 105 is not conjugate to the sample plane any longer. By recording the light field, both the amplitude and phase, instead of intensity alone, the system can overcome the blurring issue imposed by defocusing.

Scalar wave theory describes spatial evolution of a light field 110 propagating in space. The light fields at two different locations in the beam path can be connected using the Fresnel propagation kernel. See Goodman J. Introduction to Fourier optics: Roberts & Company Publishers; 2005. Therefore, once the light field 110 is recorded at the camera plane 105, the light field 110 at the image plane 90 can be numerically obtained by applying the Fresnel propagation kernel in the opposite direction (FIG. 6). The light field 110, the amplitude and phase of light, can be recorded using light field imaging techniques such as a Shack-Hartmann sensor, interferometry, and a transport of intensity method. FIGS. 7A and 7B show an example of sharpness restoration using light field imaging and the Fresnel backpropagation. FIG. 7A is an example of a blurred image 115 recorded at the camera plane, which was numerically generated here for a defocus distance of 100 mm. Applying the Fresnel backpropagation kernel to the recorded light field, the system 5 can get a sharp image 120 as shown in FIG. 7B.

Figure 8:
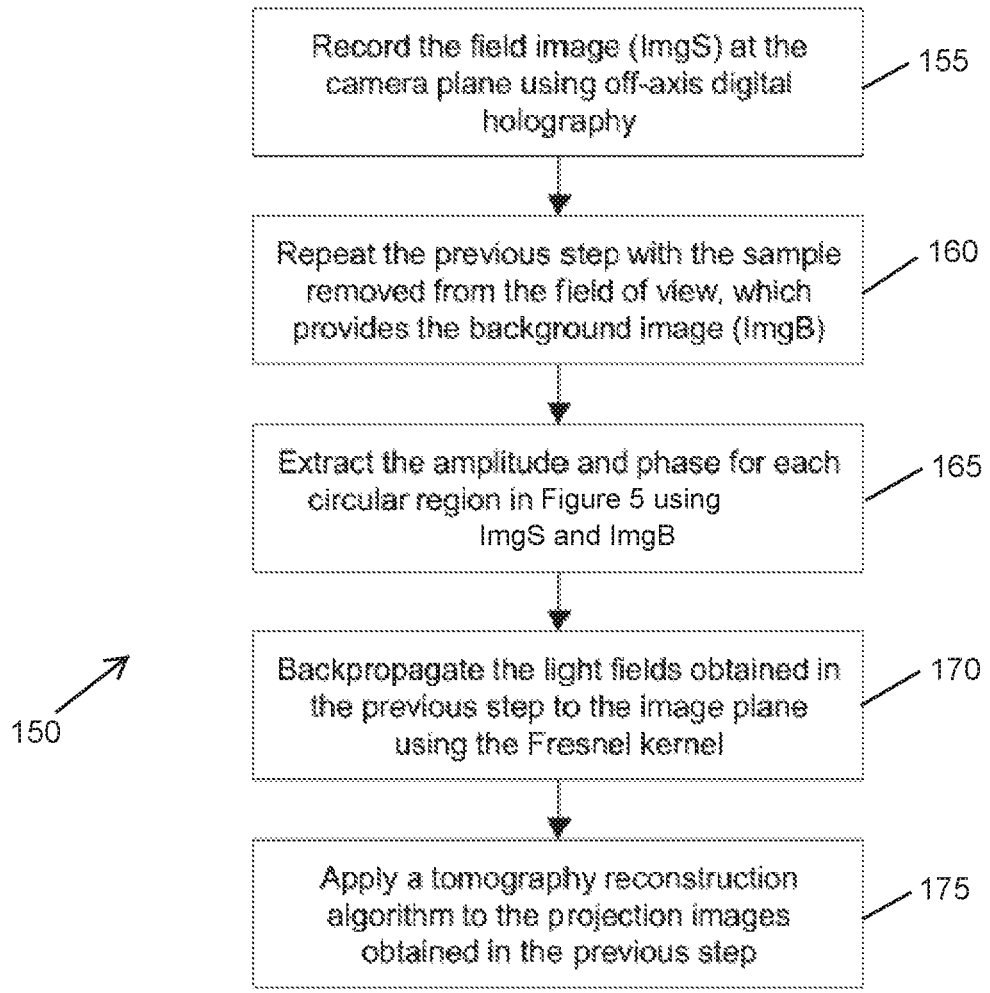
FIG. 8 is a flow chart of a process flow sequence for data collection and image processing in accordance with embodiments of the invention.

FIG. 8 shows a process flow sequence 150 for data collection and image processing in accordance with some embodiments of the invention. First (block 155), the sample 60 to be imaged is placed in the field of view, and the light field image (ImgS) is recorded at the camera plane 105 using the system 5 shown in FIG. 1. Then (block 160), the sample 60 is removed from the field of view and another light field image is recorded, called the background image (ImgB). From ImgS and ImgB (block 165), the amplitude and phase of each projection image corresponding to a circle 100 in FIG. 5 can be extracted. Next (block 170), using the Fresnel kernel, the light fields 100 obtained in the previous step (block 165) are propagated in the backward direction to the image plane 90. This operation provides sharp images, each of which corresponds to the projection image recorded in conventional tomography for a different angle of illumination onto the sample. At block 175, the system 5 applies a tomography reconstruction algorithm to the projection images 100, resulting in a three-dimensional tomogram of the imaged specimen.

Figure 9:
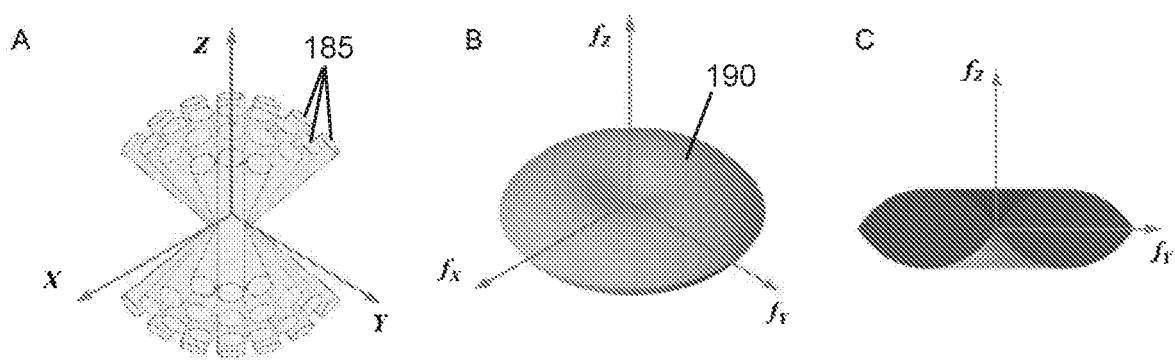
FIG. 9A is a perspective view of a light intensity distribution at a sample plane for the system of FIG. 1.
FIG. 9B is a rendered perspective view of an optical transfer function.
FIG. 9C is a sectional view at the $f_Y$-$f_Z$ cross-section of the optical transfer function of FIG. 9B.

In FIG. 9A, each cylindrical column 185 represents a collimated beam incident onto the sample 60. X and Y represent the transverse coordinates of the sample plane, and Z is the optical axis 80. The maximum angle 65 of illumination is determined by the numerical aperture of the condenser lens 25 and the objective lens 30. Beams with an illumination angle outside the numerical aperture cannot pass through the imaging system 5. FIG. 9B is a three-dimensional rendered view of the optical transfer function of digital holographic tomography, which displays its support region (boundary 190). $(f_X, f_Y, f_Z)$ represent the spatial-frequency components corresponding to (X,Y,Z), respectively. FIG. 9C is the $f_Y$-$f_Z$ cross-section of FIG. 9B. The optical transfer function represents the spatial-frequency spectrum acquired in an imaging system, and its three-dimensional inverse Fourier transform can be connected to the point spread function—the response of an imaging system 5 to a point source. As can be seen in FIGS. 9B and 9C, the optical transfer function of digital holographic tomography is highly asymmetric; its transverse dimensions (in the $f_X$-$f_Y$ plane) are greater than the vertical dimension (along the $f_Z$ direction), which explains the vertical resolution worse than the transverse resolution in digital holographic tomography. More serious, the spatial-frequency components near the origin of the coordinates are completely missing in FIGS. 9B and 9C. The missing information in this "apple-core" region, called missing cone, is difficult to retrieve using regularization, especially when the specimen is thin or has a gradually-varying refractive index distribution. Detailed explanation about the missing cone problem in digital holographic tomography and regularization techniques to alleviate the problem can be found in the references: Sung Y, Dasari R R. Deterministic regularization of three-dimensional optical diffraction tomography, J Opt Soc Am A. 2011; 28(8):1554-61, and Lim J, Lee K, Jin K H, Shin S, Lee S, Park Y, et al. Comparative study of iterative reconstruction algorithms for missing cone problems in optical diffraction tomography. Optics express. 2015; 23(13):16933-48.

To overcome the missing cone problem in digital holographic tomography, two snapshot tomography systems 5A and 5B (FIG. 10) can be arranged in an orthogonal configuration. The optical axes of the two systems 5A and 5B are orthogonal to each other and meet at the center of sample plane in yet another embodiment of the invention.

Figure 11:
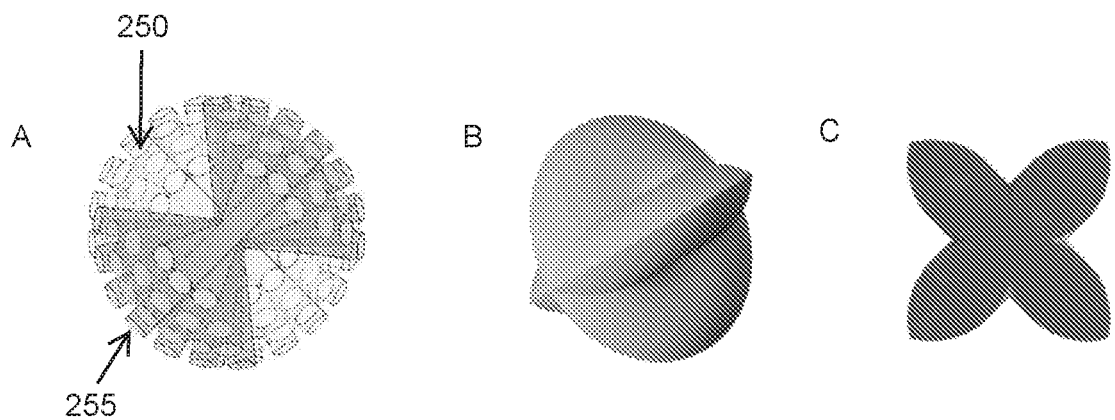
FIG. 11A is a perspective view of a second light intensity distribution at a sample plane for the system of FIG. 10.
FIG. 11B is a rendered perspective view of an optical transfer function for the system of FIG. 10.
FIG. 11C is a sectional view at the $f_Y$-$f_Z$ cross-section of the optical transfer function of FIG. 11B.

FIG. 11A shows two groups 250 and 255 of cylindrical columns, each of which represents collimated beams for one of the subsystems. FIGS. 11B and 11C show the optical transfer function for the proposed system 275 of FIG. 10 and its $f_Y$-$f_Z$ cross-section, respectively. The missing-cone region for sub-system 5A is now completely filled with the data measured using the orthogonally-installed sub-system 5B. The missing cone problem has been known since the first demonstration of diffraction tomography in the ultrasound regime. It has also been known that using multiple objective lenses surrounding the sample, one can retrieve more frequency components. However, objective lenses with a large working distance usually have very low NA (<0.2). Simply using multiple low-NA objective lenses, it is possible that more frequency components are lost than in original digital holographic tomography. It is preferred to adopt objective lenses with a large working distance and a high NA. The system configuration disclosed in one embodiment uses objective lenses with a relatively large working distance (2 mm) and high NA (0.8), which Nikon®, for example, started to produce recently.

It is envisioned that additional embodiments may provide even more information with yet additional systems 5. For example, it is envisioned that a third system 5 can be orthogonal to systems 5A and 5B (i.e., along a third axis), which can provide even more information.

Figure 10:
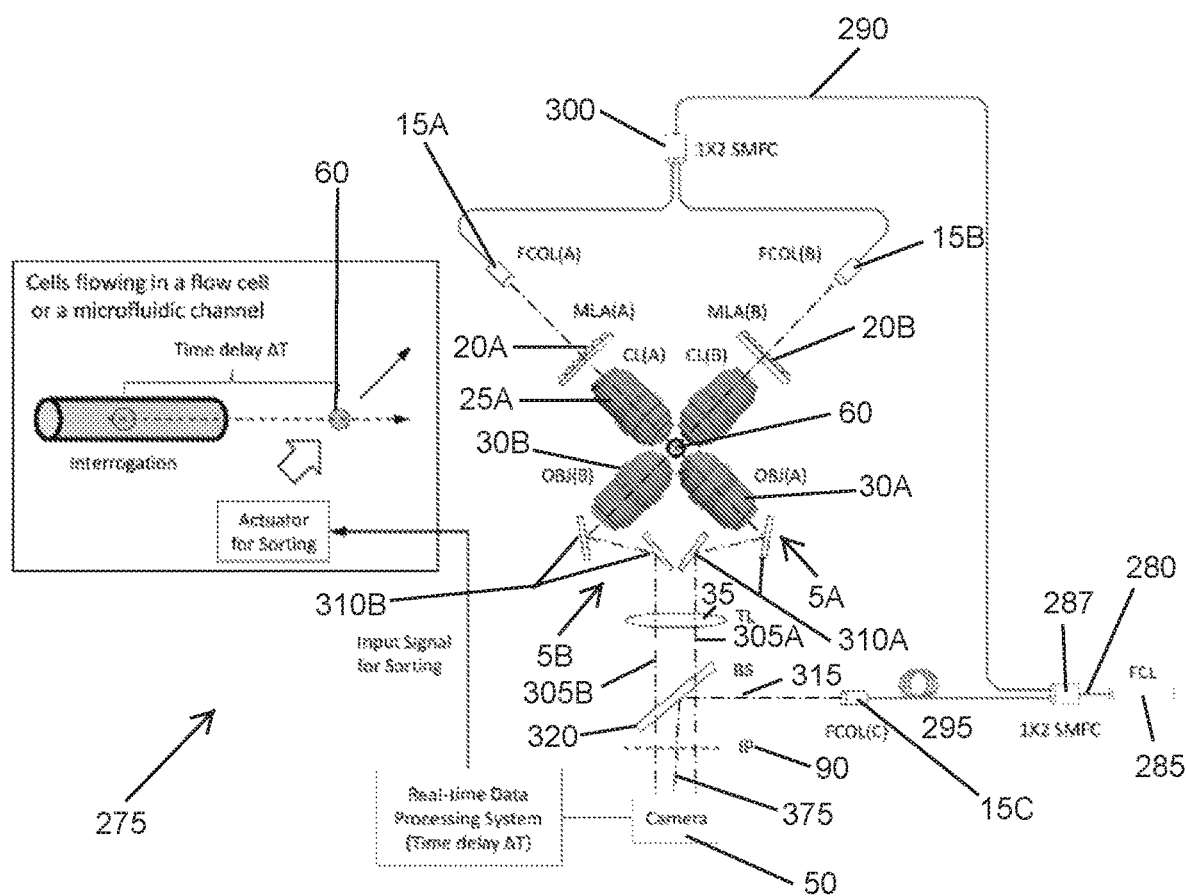
FIG. 10 is a schematic diagram of a second proposed exemplary snapshot optical tomography system incorporating aspects of the invention.

In at least one embodiment, the invention builds on snapshot optical tomography to collect projection images in a single shot by using angular multiplexing of illumination and light-field imaging. FIG. 10 shows a schematic diagram of a proposed high-throughput holographic three-dimensional imaging flow cytometry system 275. A laser beam 280 from a fiber-coupled laser (FCL) 285 is fed into a 1×2 single-mode fiber coupler (1×2 SMFC) 287. One of the coupler outputs is fed into the sample beam path 290 and the other into the reference beam path 295. The sample beam is split into two by another 1×2 single-mode fiber coupler 300; each of which is fed into one of the snapshot tomography subsystems (marked as 5A and 5B). In each sample beam path, the laser beam coming out of the fiber is collimated by a fiber collimator (FCOL) 12. The micro-lens array (MLA) 20A after the fiber collimator 15A generates a two-dimensional (2-D) array of focused beams 55 at the back focal plane 130. Each focused beam is collimated by the condenser lens (CL) 25A and illuminates the sample 60. For example, the sample can be cells flowing in a flow cell or microfluidic channel. The flow cell or microfluidic channel should be immersed in an index-matching medium; otherwise, the wavefront distortion of the interrogating beam due to the tube can overwhelm the sample-induced phase delay, which will reduce the signal-to-noise ratio of phase measurement. The objective lens (OBJ) 30A and tube lens (TL) 35 in a 4-f configuration magnify and relay the beams 305A to the image plane 90. The sample beams 305A and 305B from the two subsystems are made parallel using two set of mirrors 310A and 310B. The camera 50 is located at a defocused camera plane 105 for the reason explained above. The reference beam 315 at the exit of the first 1×2 single-mode fiber coupler 285 is collimated by fiber collimator (C) 15C and introduced at an angle with respect to the sample beams by tilting the beam splitter (BS) 320. Introducing a reference beam 315 at an angle and measuring the interferogram of the sample beam 305A/305B and the reference beam 315, one can record both the amplitude and phase encoded in the sample beam 305A/305B. Once the light fields are recorded, the blurred images can be numerically propagated back to the image plane 90, where each projection image has the highest sharpness (FIGS. 7A and 7B). Finally, applying a tomography reconstruction algorithm such as the inverse Radon transform (see Slaney M, Kak A. Principles of computerized tomographic imaging. SIAM, Philadelphia. 1988.), or more rigorously optical diffraction tomography (see Wolf E. Three-dimensional structure determination of semi-transparent objects from holographic data. Optics Communications. 1969; 1(4):153-6 or Devaney A. Inverse-scattering theory within the Rytov approximation. Optics Letters. 1981; 6(8):374-6), to the projection images, the three-dimensional tomogram of sample 60 can be reconstructed. In some systems 5 or 275, the projection images for each tomogram are angularly multiplexed and captured in a single shot. The image processing algorithm to extract the projection images together with a tomographic reconstruction algorithm can be implemented on a field-programmable gate array (FPGA), which allows image recording and processing at an unprecedented speed. See Johnston C, Gribbon K, Bailey D, editors. Implementing image processing algorithms on FPGAs. Proceedings of the Eleventh Electronics New Zealand Conference, ENZCon'04; 2004. Once the refractive index tomogram is reconstructed, morphological and chemical information can be extracted from it, which allows one to analyze and sort cells based on the information. Furthermore, once the parameters of interest are known for specific types of samples, such parameters can be directly extracted from the projection images without reconstructing a tomogram. The time ($\Delta$T) required for capturing an image, processing it and extracting the parameters of interest determines the sorting speed (1/$\Delta$T). For sorting purposes, a proposed system can be used in series with existing actuator and sorting techniques (see Herzenberg L A, Sweet R G, Herzenberg L A. Fluorescence-activated cell sorting. Sci Am. 1976; 234(3):108-17 or Andersson H, Van den Berg A. Microfluidic devices for cellomics: a review. Sensors and actuators B: Chemical. 2003; 92(3):315-25), in which the extracted parameters are used as signals for the actuator.

The proposed system and method can be applied to many micrometer-millimeter thick samples that do not completely absorb light. In one implementation, three-dimensional refractive index distribution can be obtained for micrometer-millimeter sized particulates. In this case, the three-dimensional image is recorded in a single snapshot without scanning the beam or rotating the sample, so the measurement can be done on stationary samples or flowing samples. In another implementation, in conjunction with a translation stage, the three-dimensional refractive index map of a large-area specimen can be acquired. Large-area specimens such as thin films, sliced tissue specimens, can be imaged using the systems and methods. Compared to the existing methods, the imaging speed of the proposed method is only limited by the time required for changing the field of view. The measurement does not require any special sample preparation.

Particles made from a variety of materials including metal oxides, e.g. SiO2, TiO2, Fe2O3, etc. can be measured using the systems and method discussed herein. Particles can be crystalline, semi-crystalline or amorphous, including glasses, (e.g. soda lime, borosilicate glasses, etc.), polymers (e.g. polystyrene, polyethylene etc.), drug capsules, microdroplets or any other particulates or agglomerates that result in a particulate that is micron sized or larger. Refractive index distributions can be used to distinguish cracking in particulates, grain boundaries, and stress and strain distribution in 3-D. If the system is coupled with a wavelength-scanning light source, chemical information such as material composition can be obtained and chemical impurities in these materials can also be detected.

Viruses and bacteria can be imaged using the systems and methods disclosed herein to detect the type and the pathogenicity. Single cells such as blood cells, hematopoietic stem cells, or the cells dissociated from a tissue can also be imaged. The system can distinguish normal cells from cancer cells (e.g., leukemic cells) based on the 3-D morphology and refractive index value. By measuring the mass change, it can also monitor the effect of a drug treatment (e.g. proteasome inhibitor) on a cell. The survivability of embryos after transfer in an in-vitro fertilization process can also be assessed based on the measurement.

Figure 12:
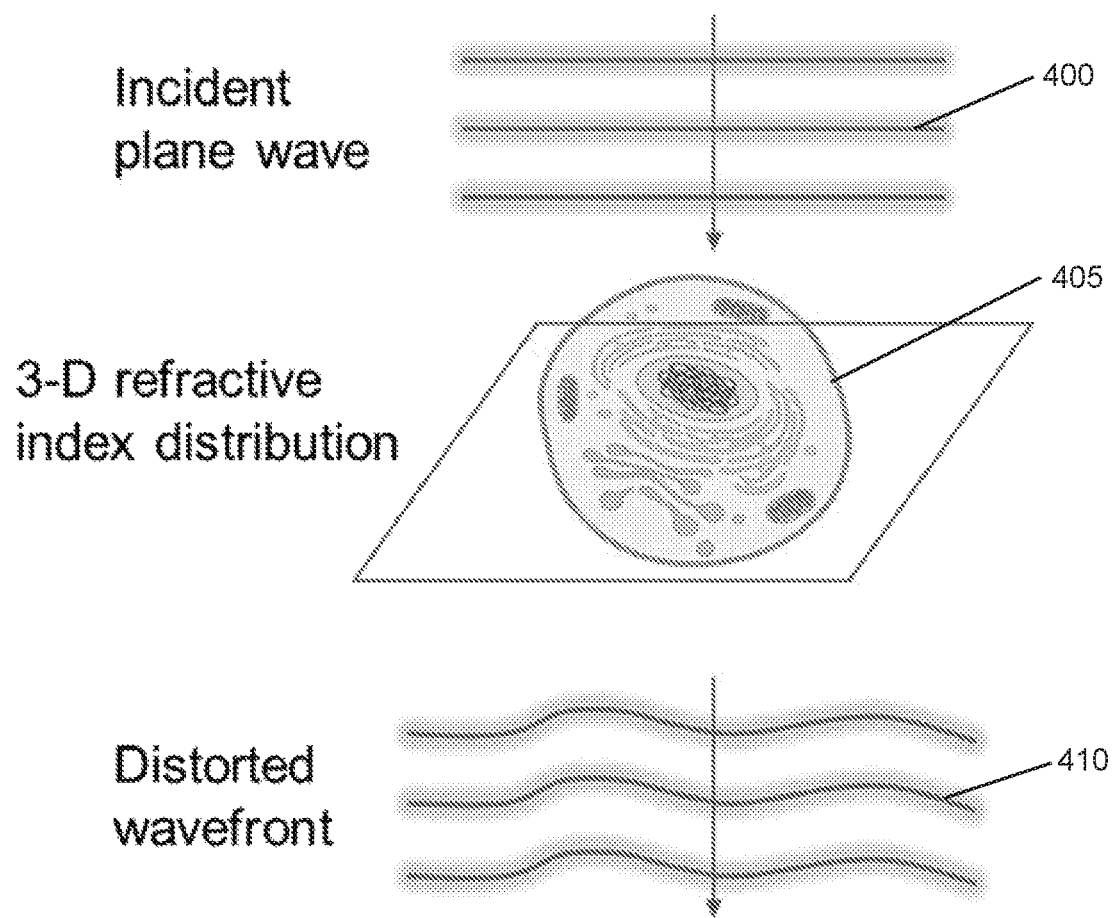
FIG. 12 represents a plane wave being distorted by a cell.
Figure 13:
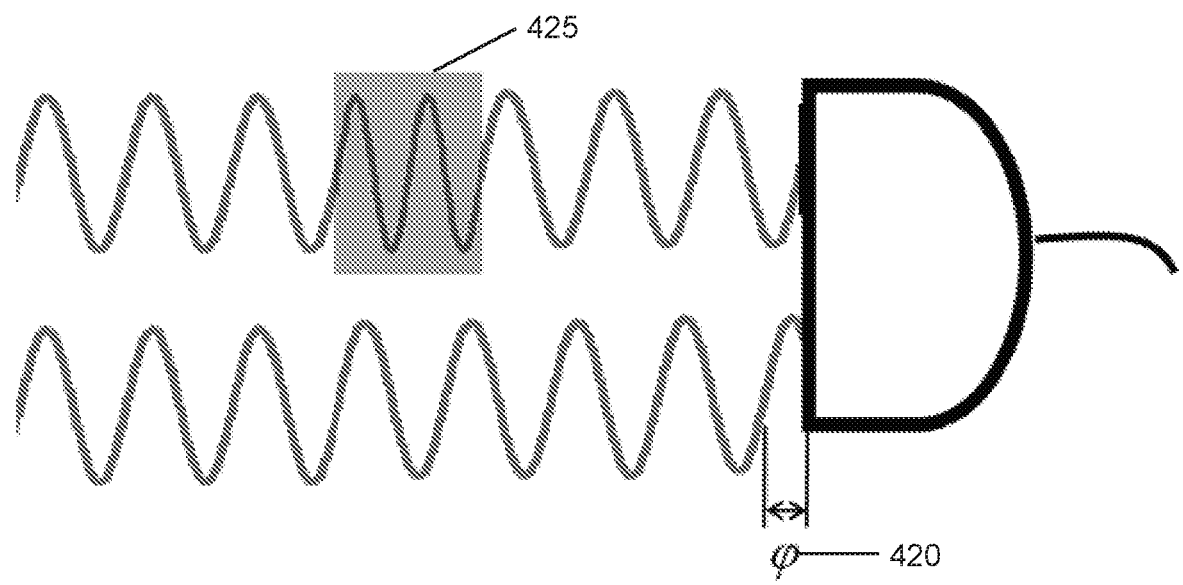
FIG. 13 represents two light waves, one of which has a phase delay due to the sample in the beam path.
Figure 14:
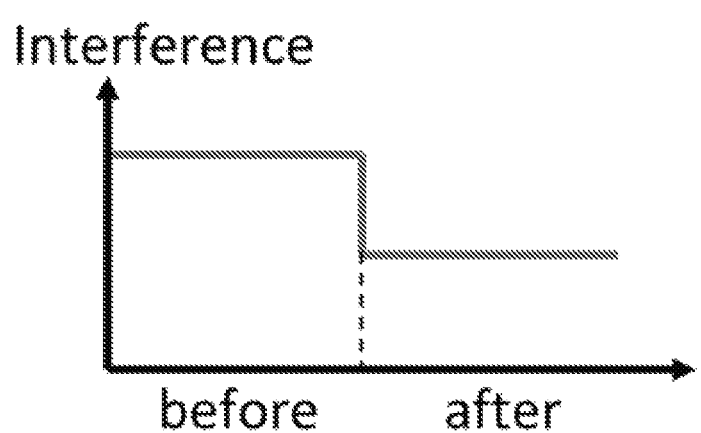
FIG. 14 represents an intensity change based on interference of the cell.

FIG. 12 shows an example of an incident plane wave 400 on a cell 405, resulting in a distorted wave. Digital holographic microscopy (DHM) can record the phase delay or wavefront distortion of light (FIG. 13), which contains the information about the sample's refractive index distribution. One example implementation of digital holographic microscopy is to use an interferometer 425 (FIG. 13): the intensity 430 of the interferogram changes with the phase difference between the sample and the reference beam (FIG. 14).

Figure 15:
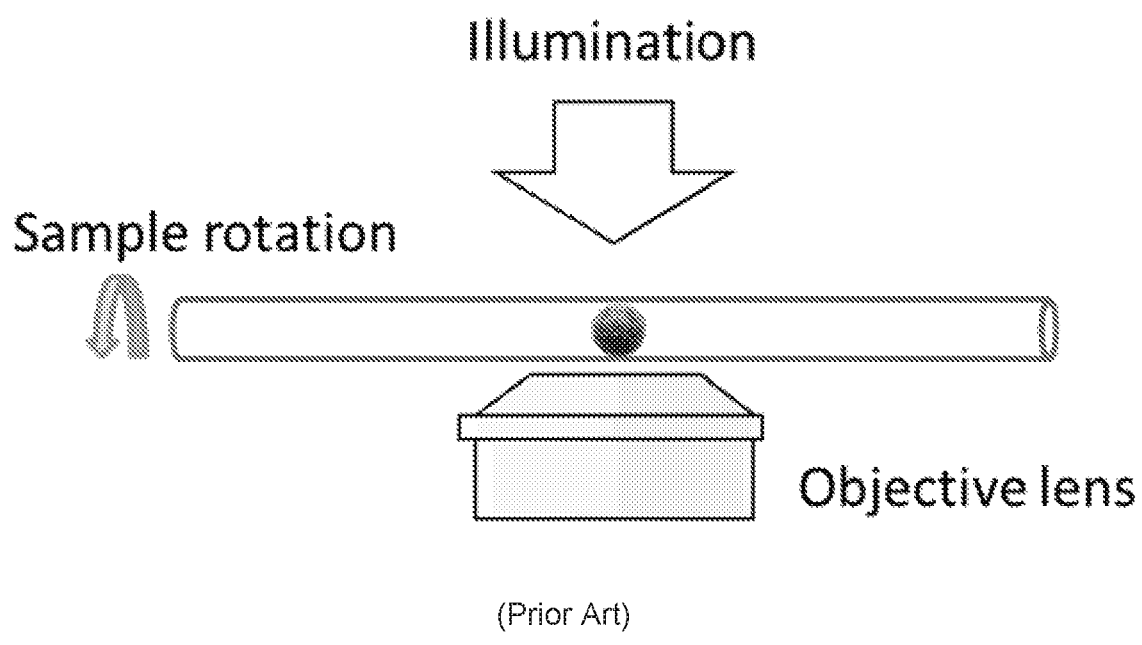
FIG. 15 represents a rotation of a sample with respect to illumination.
Figure 16:
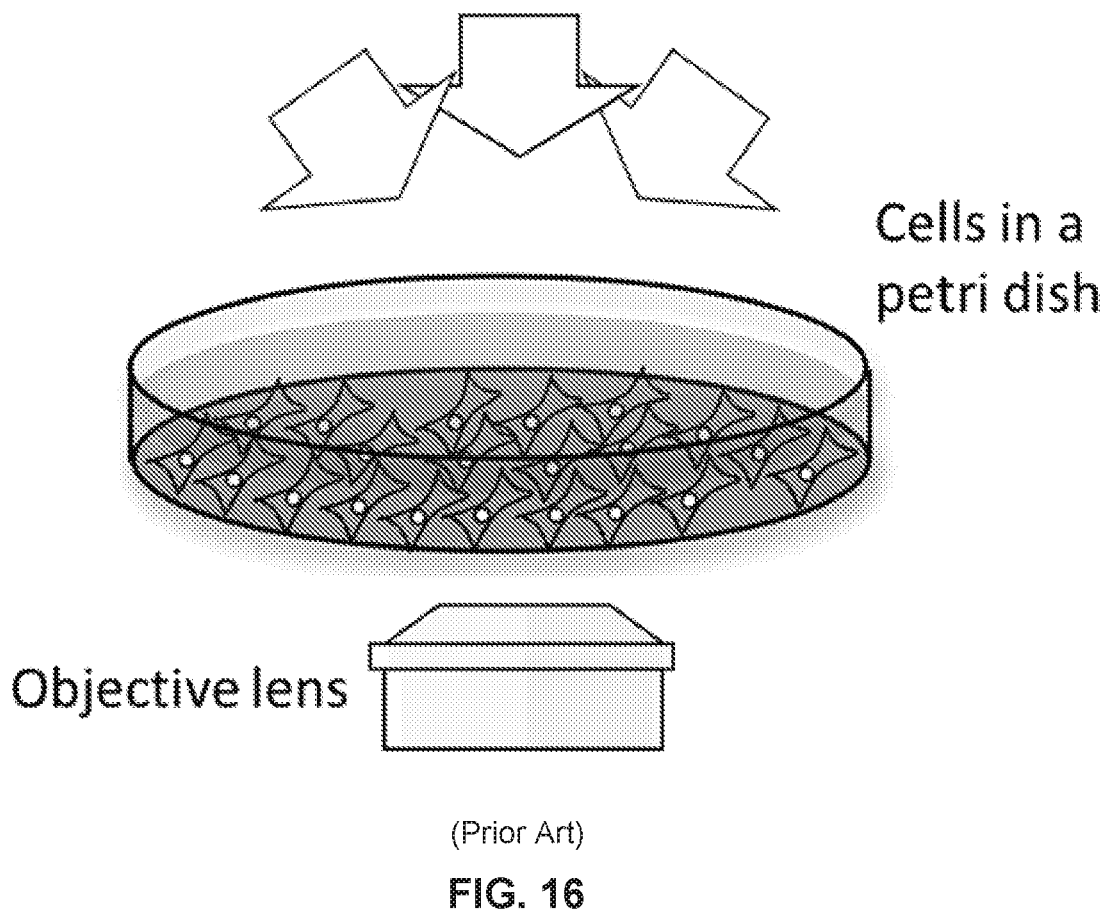
FIG. 16 represents a rotation of an illumination beam with respect to a sample.

The image that digital holographic microscopy acquires for a specific illumination angle is a projection image, which corresponds to the accumulation of the refractive index along the beam path. To acquire a 3-D refractive index distribution within a sample, one needs to acquire multiple projection images for different angles of illumination as in X-ray computed tomography (CT). This is typically called digital holographic tomography (DHT). To change the illumination angle, existing systems and methods rotate the sample (FIG. 15) or rotate the illumination beam (FIG. 16). Installing a scanning mechanism increases the data acquisition time as well as the system footprint.

Figure 17:
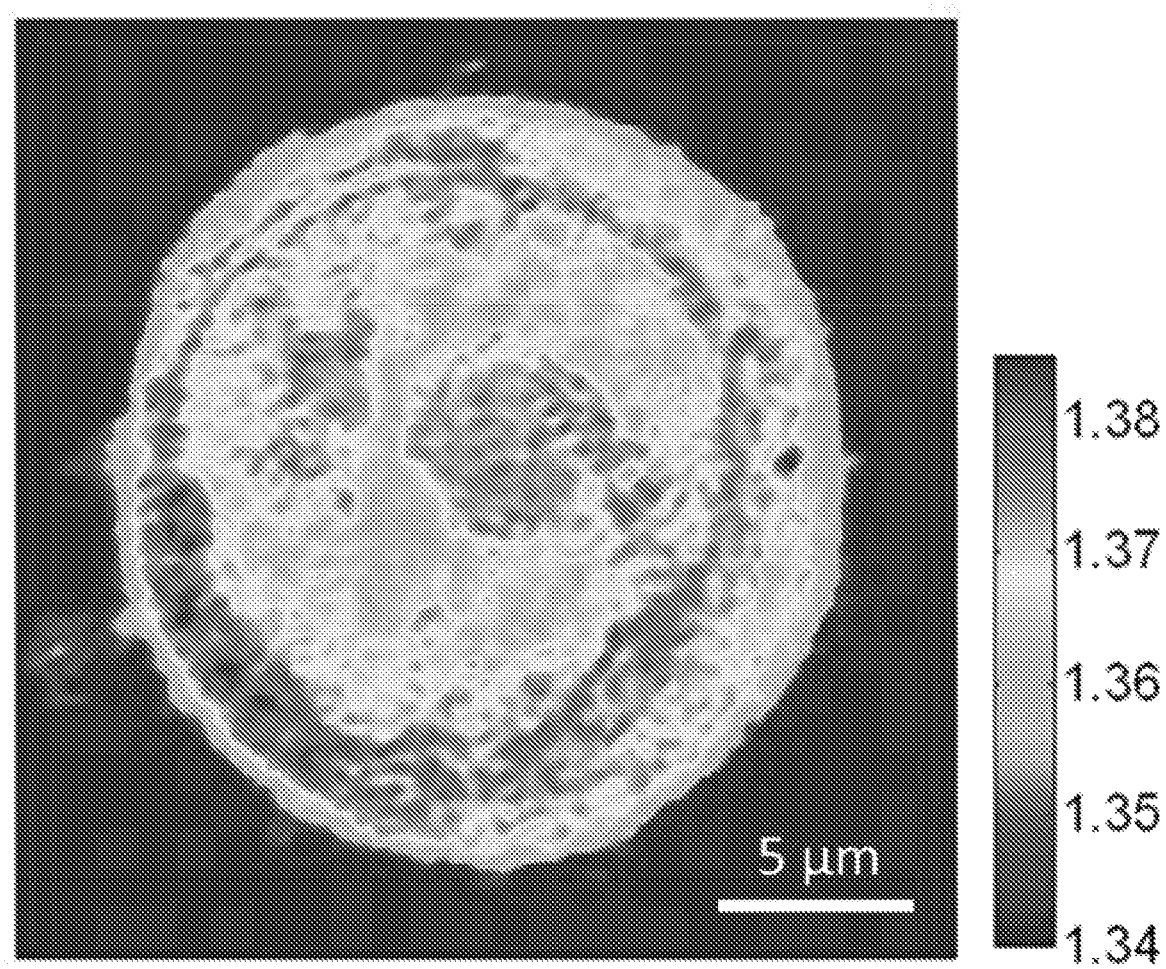
FIG. 17 provides a cross-section of a three-dimensional refractive index map recorded with digital holographic tomography.

FIG. 17 provides a cross-section of a three-dimensional refractive index map recorded with digital holographic tomography. The spatial resolution is twice the diffraction limit. For example, the horizontal resolution is about 100 nm and the vertical resolution is about 200 nm when a green light with the wavelength of 532 nm is used.

Figure 18:
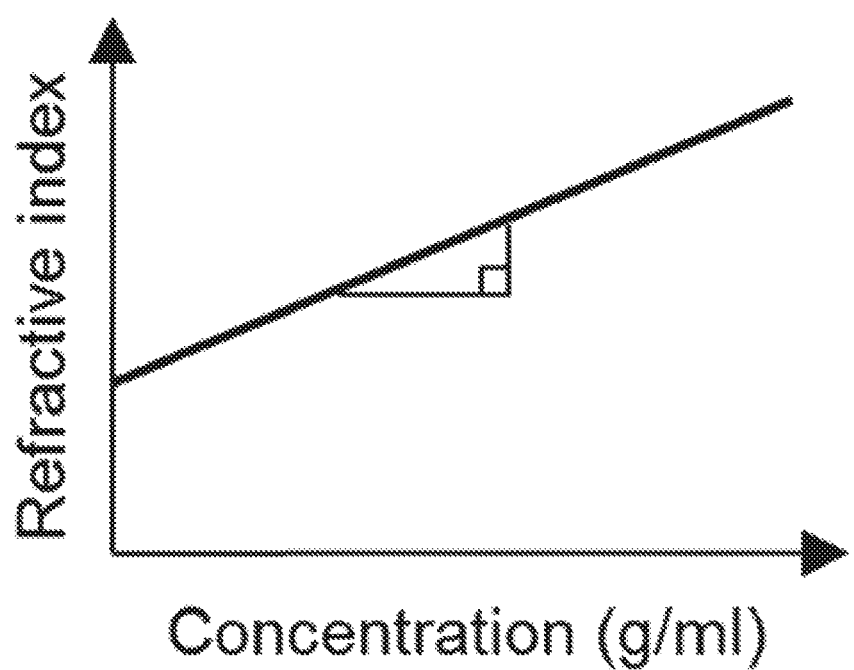
FIG. 18 is a graph of refractive index versus the solute concentration in a sample.

Refractive index (FIG. 18) of a solution is proportional to the concentration of each species comprising the solution. Thus, the refractive index not) that digital holographic tomography records is a weighted sum of the concentrations (CO of molecules within a cell: $n(\lambda)=n_0(A)+\Sigma_i \alpha_i(\lambda)C_i$, where $n_0(\lambda)$ is the refractive index of the medium in which the cell is immersed; and $\alpha_i(\lambda)$ is the refractive increment for i-th molecular species. FIG. 18 shows the linearity between the refractive index and the concentration of an i-th species. By measuring the refractive index map in three dimensions, one can measure biophysical (e.g., volume, mass and density) and biochemical (e.g., chemical composition) parameters that can be related to the physiological state of a cell. Importantly, these measurements can be done in a minimally invasive manner, because digital holographic tomography does not require using external contrast agents or genetic manipulation to express fluorescent molecules. Using a plane wave, instead of an intense focused beam, the sample is minimally exposed to the light.

Figure 19:
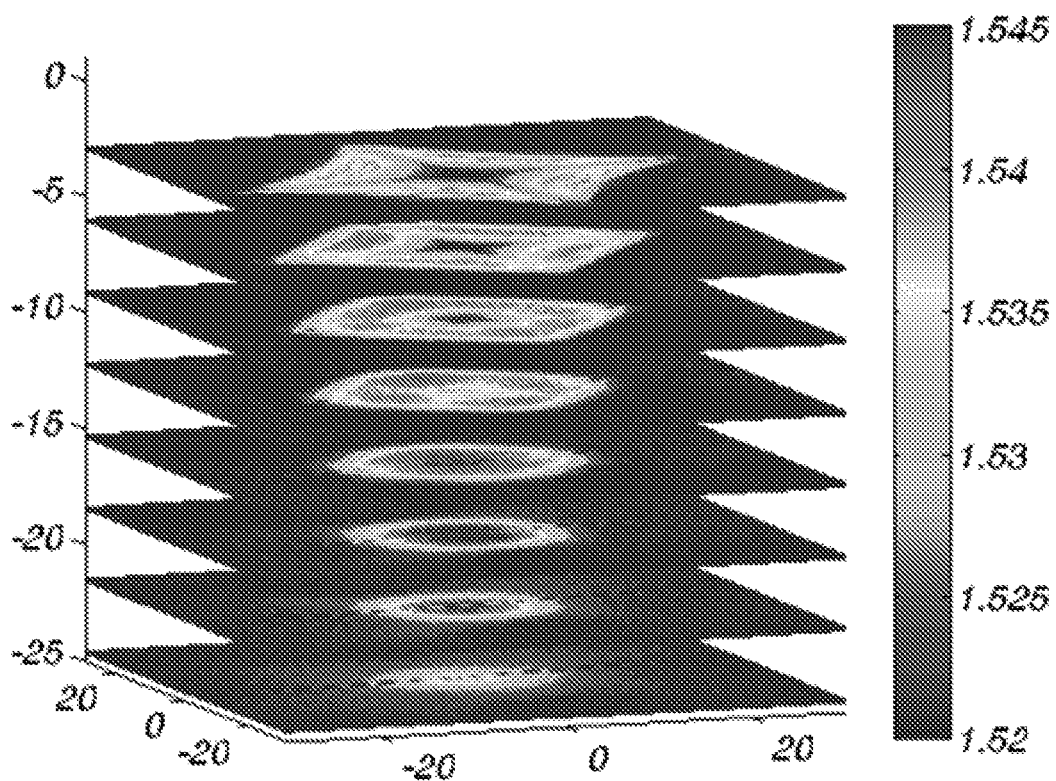
FIG. 19 provides cross-sections of a three-dimensional refractive index map for an indented glass specimen.
Figure 20:
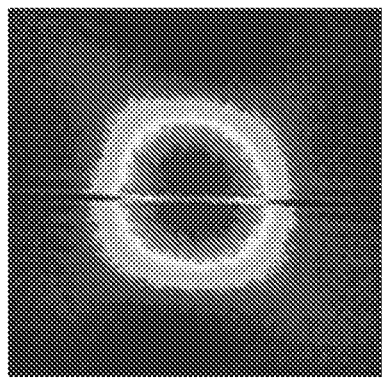
FIG. 20 provides one of the cross-sections of the three-dimensional refractive index map in FIG. 19.

FIG. 19 shows a three-dimensional refractive index distribution within a soda-lime glass under Vickers indentation (1000 g). Oxide glasses are known to have extremely high intrinsic failure strain and failure stress, e.g., strength, but they are easily damaged, leading to up to two orders of magnitude decrease in strength due to either quasi-static indentation or scratching. The refractive index measurement can provide the stress distribution within a glass (FIG. 19) for varying loading conditions, and thus, it allows studying the mechanism that leads to the failure of a glass. It also allows recording the location and shape of a crack together with the stress distribution around the crack (FIG. 20).

Figure 21:
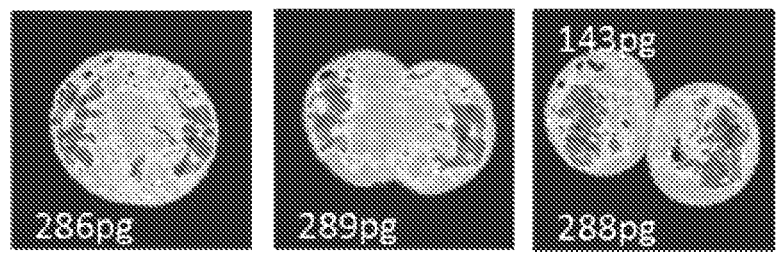
FIG. 21 provides a cross-section view of a splitting cell.
Figure 22:
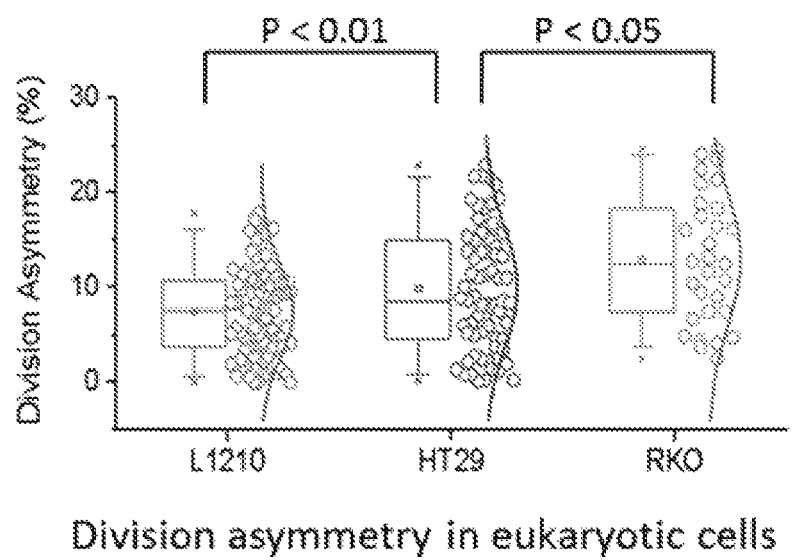
FIG. 22 is a graph of a division asymmetry percentage in eukaryotic cells.
Figure 23:
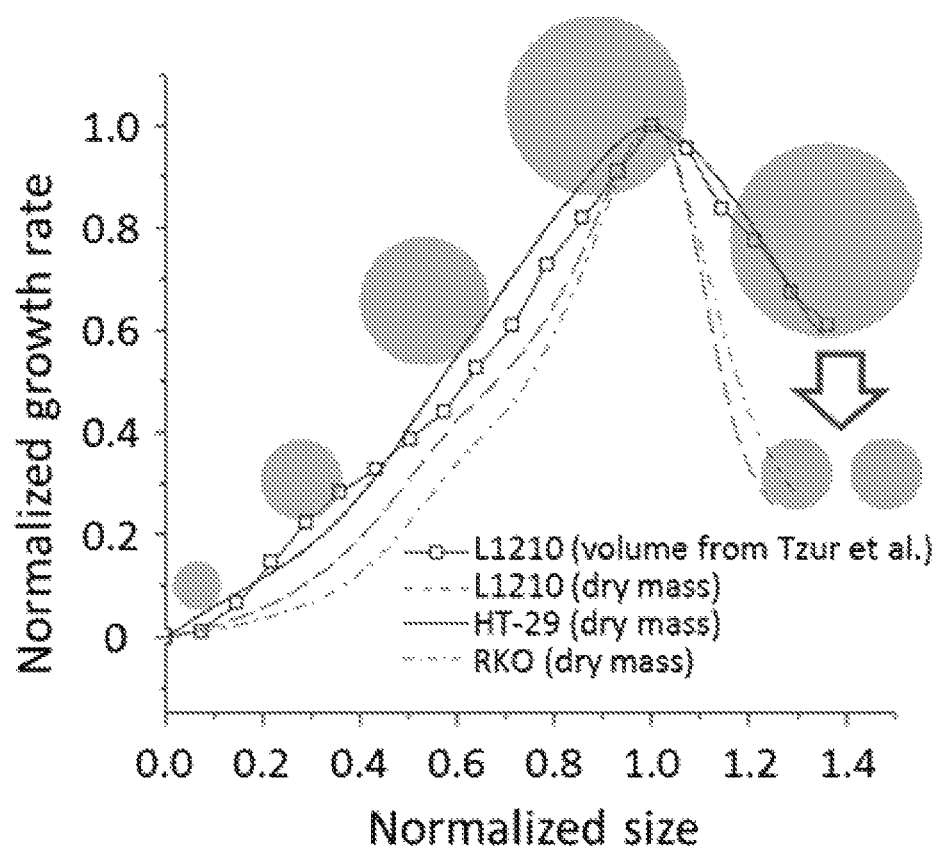
FIG. 23 is a graph of normalized growth rate versus normalized size.

FIGS. 21-23 show a cell size homeostasis in adherently growing cells studied with a picogram-level cell mass measurement. Using a system incorporating the invention, one can measure the mass of a cell with picogram sensitivity. In one system, digital holographic tomography can be used to quantify the asymmetry of division (FIGS. 21 and 22) and the growth rate (FIG. 23) of cells in an exponentially-growing population. The accurate measurement confirmed the existence of a mechanism within a cell to monitor its size and coordinate the growth and division. This observation was made for floating cells, but not for adherent growing cells due to the lack of a sensitive measurement technique.

Chondrocyte enlargement can also be studied with embodiments of the invention. Using digital holographic tomography to measure the volume and density of single cells, it was shown that mammalian chondrocytes undergo three distinct phases of volume increase, including a phase of massive cell swelling in which the cellular dry mass is significantly diluted.

Label-free detection of hematologic malignancies. As a potential application, digital holographic tomography could be used to measure the internal structure of blood cells to detect abnormalities. For example, when stained with Haemotoxylin and Eosin (H&E), hypergranular promyelocytic leukemia show heavily stained granules and single or bundles of Auer rods; and acute myeloid leukemia show cup-like nuclear phenotype or nuclear invaginations. However, identifying leukemic cells by their morphological abnormalities requires the proficiency of a technologist, which is subject to vary. The results also depend on the origin of sample and the type of staining. Digital holographic tomography can capture these features rapidly and accurately without any artefacts introduced by staining.

Figure 24:
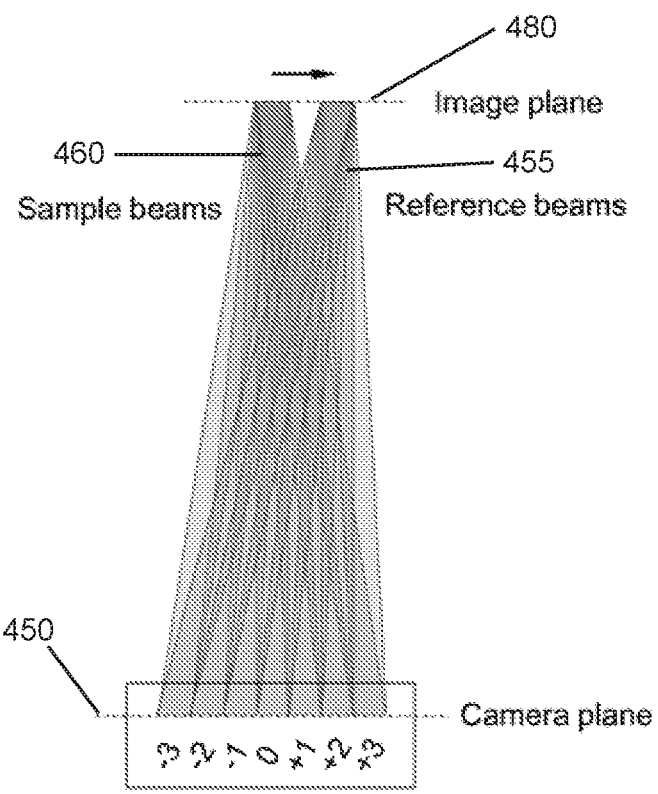
FIG. 24 is a schematic representation of an off-axis digital holography implementation.
Figure 25:
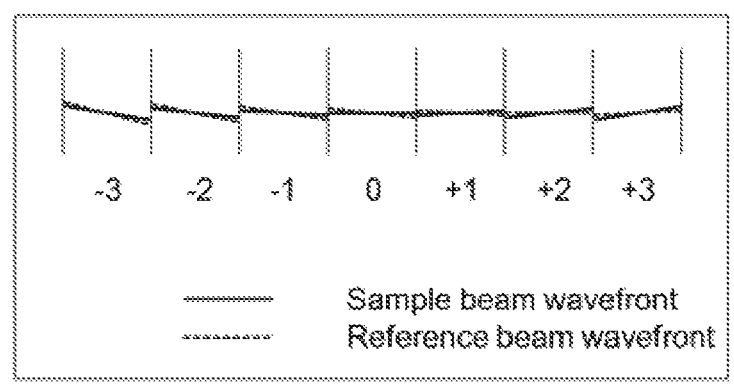
FIG. 25 is a representation of a sample beam wavefront and a reference wavefront for the implementation in FIG. 24.

FIG. 24 shows another implementation with off-axis digital holography. The implementation of FIG. 24 uses a plane wave as a reference beam, which is slightly tilted at an image plane to generate an interferogram with straight fringes. The fringe pattern is modulated by the sample-induced phase; thus, by applying a fringe analysis technique to the recorded fringe pattern, the system can extract the amplitude and the phase induced by the sample. The raw image contains a multitude of projection images, each of which arrives at a defocused plane 450 from a different direction. Using a plane wave as a reference beam, the projection image corresponding to a high angle of illumination would generate fringes that are too fine, while the one near the center would generate fringes that are too coarse. To overcome this limitation, a system can generate a multitude of reference beams 455 that are identical to the sample beams 460. By shifting the reference beams 455 laterally with respect to the sample beams 460, the generated straight fringes are of the same period in all the projection images (see the FIG. 25). The beams carrying the projection images arrive at the camera plane 450 with different angles. The reference beams that are identical to the sample beams are introduced onto the camera plane after slight shifting with respect to the sample beams. Due to the shifting, the wavefront of each sample beam is slightly tilted with respect to the wavefront of the corresponding reference beam. The amount of tilting is uniform across all the projection images; the images have straight fringes with an equal fringe period. The same fringe analysis can be applied to each projection image and provide the amplitude and phase information of the sample corresponding to a specific illumination angle.

Figure 26:
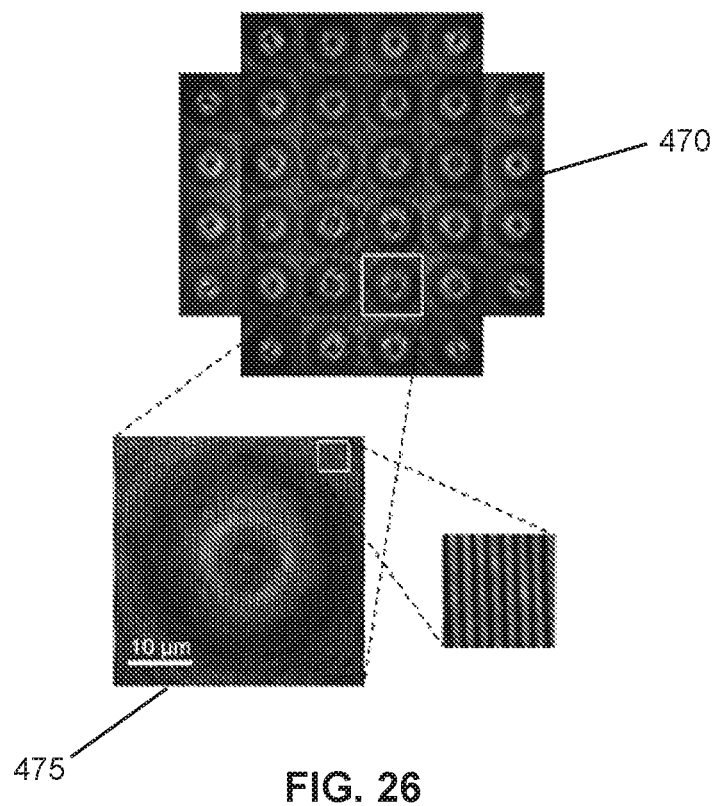
FIG. 26 shows a raw interferogram image that consists of multiple projection images. The magnified image, which corresponds to a projection image for a specific illumination angle, shows interference fringes containing the amplitude and the phase information.
Figure 27A:
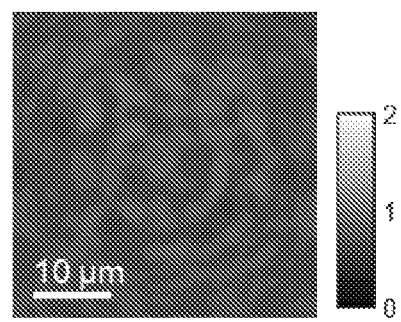
FIG. 27A show a normalized amplitude image recovered from the image in FIG. 26.
Figure 27B:
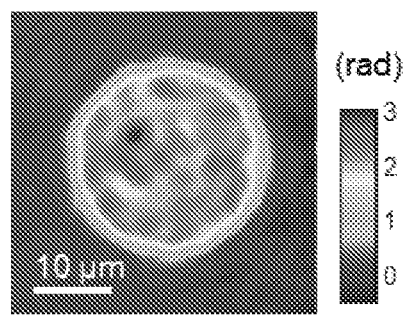
FIG. 27B show a normalized phase image recovered from the image in FIG. 26.
Figure 27C:
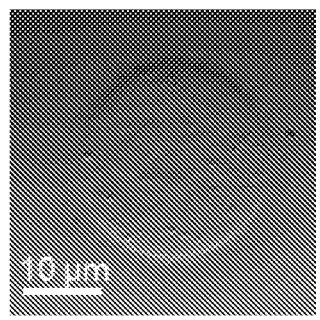
FIG. 27C show a bright-field image of the same cell in FIG. 26.
Figure 28A:
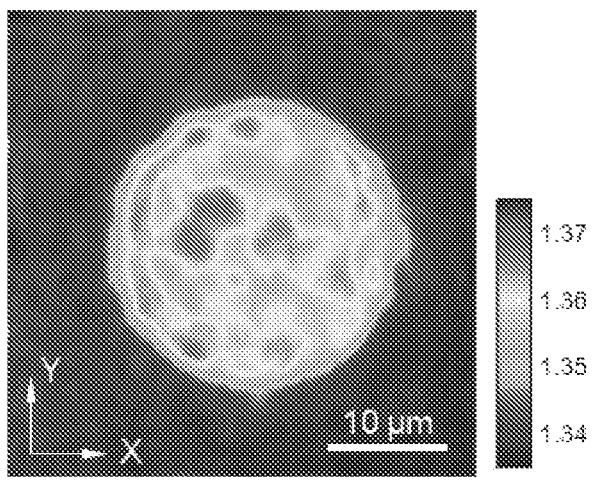
FIG. 28A show a horizontal cross-section of the reconstructed 3-D refractive index map of the cell in FIG. 26.
Figure 28B:
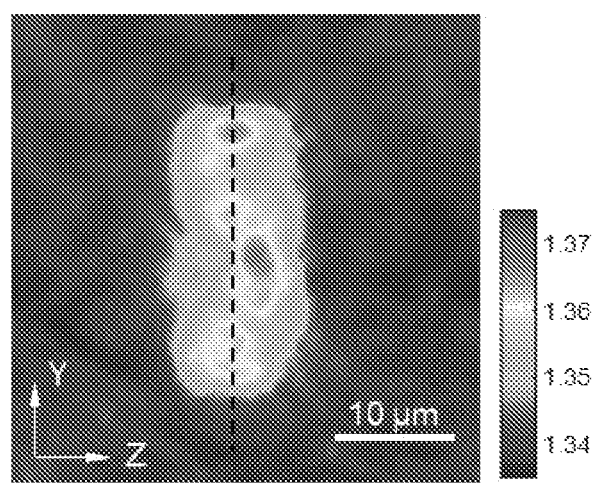
FIG. 28B show a vertical cross-section of the reconstructed 3-D refractive index map of the cell in FIG. 26.

FIG. 26 shows a raw image 470 acquired with a system implementing the technique of FIG. 24. FIG. 26 includes an enlarged view of one of the projection images in the raw image 470. The sample used for imaging was a HeLa cell. With reference to FIG. 26, the figure shows the raw interferogram image 470 of the sample, which consists of multiple projection images corresponding to different illumination angles. Each interferogram 475 has straight fringes with the period of about three pixels, which can be used for field measurement using off-axis digital holography. For each projection image 475, a system can first apply a fringe analysis to retrieve the amplitude and the phase at the defocused plane where the camera was placed. Then, the system can apply scalar wave theory to acquire the amplitude and the phase image, FIGS. 27A and 27B, respectively, at the image plane 480 (FIG. 24)—where the images are sharpest. Even after restoring the sharpness, the projection images (FIGS. 27A and 27B) do not show the internal structure of the sample, as seen in the bright-field image, FIG. 27C. Because FIGS. 27A and 26B show the accumulation of attenuation and phase alteration, respectively, across the entire sample, the features at different heights are shown mixed in the images. FIG. 27C, on the other hand, shows one horizontal cross-section of the three-dimensional specimen at the location of the objective lens focus. In the bright-field imaging, the cross-sections at different heights are acquired by scanning the objective lens focus. The three-dimensional refractive index map is restored by applying a tomographic reconstruction algorithm to the projection images, which were acquired in a single snapshot. FIGS. 28A and 28B show a horizontal and vertical cross-section, respectively, of the reconstructed tomogram, which clearly shows the nucleus boundary and the internal structure within the sample. The refractive index value at each location is proportional to dry density, which is the density of non-aqueous molecules. The refractive index value of 1.37 corresponds to the molecular concentration of 0.174 mg/ml.

Various features of the invention are set forth in the following claims.

What is claimed is:

1. A snapshot optical tomography system for capturing an image of a sample, the system comprising:
a light source;
a microlens array coupled to the light source to provide a first beam having a first path and a second beam having a second path, the second path being different from the first path;
a condenser lens to collimate the first beam and the second beam on the sample at a sample plane from different angles of illumination;
a second lens to relay the first beam and the second beam at-from the sample plane to an image plane;
a camera to acquire a first image associated with the first beam and acquire a second image associated with the second beam, the camera acquiring the first image and the second image at a camera plane, the camera plane being different from the image plane; and
a processor and memory to
generate a first backpropagated image by adjusting the first image from the camera plane to the image plane using a backpropagation technique,
generate a second backpropagated image by adjusting the second image from the camera plane to the image plane using the backpropagation technique, and
generate a reconstructed image of the sample using the first backpropagated image and the second backpropagated image.

2. The system of claim 1, wherein the light source includes a laser and wherein the laser generates a laser beam for the microlens array.

3. The system of claim 1, wherein the microlens array provides a plurality of beams having a plurality of distinct paths, wherein the plurality of beams include the first beam and the second beam, wherein the condenser lens collimates the plurality of beams on the sample from different angles of illumination, wherein the camera acquires a plurality of images, each image associated with a respective beam, and wherein the processor and memory generate the reconstructed image using the plurality of images.

4. The system of claim 3, wherein the plurality of images is simultaneously acquired at the camera in a single snapshot, and wherein the camera plane is at a defocused plane.

5. The system of claim 1, wherein the second lens includes an object lens and a tube lens.

6. The system of claim 1, wherein the reconstructed image includes a three-dimensional image.

7. The system of claim 1, wherein the backpropagation technique includes a Fresnel backpropagation technique.

8. The system of claim 1, wherein the sample has a thickness that does not completely absorb light when transmitted therethrough.

9. The system of claim 1, wherein a first angle of propagation for the first beam at the sample is different from a second angle of propagation for the second beam at the sample.

10. A snapshot optical tomography system for capturing an image of a sample, the system comprising:
a light source to provide a beam;
a first microlens array coupled to the light source, having a first axis, and providing a first plurality of beams with a first plurality of distinct paths;

a second microlens array coupled to the light source, having a second axis, and providing a second plurality of beams with a second plurality of distinct paths, the second axis being substantially orthogonal to the first axis;

a camera to acquire a first image associate with the first plurality of beams, and to acquire a second image associated with the second plurality of beams, the camera acquiring the first image and the second image at a camera plane, the camera plane being different from an image plane; and a processor and memory to
generate a first backpropagated image by adjusting the first image from the camera plane to the image plane using a backpropagation technique,
generate a second backpropagated image by adjusting the second image from the camera plane to the image plane using the backpropagation technique, and
generate a reconstructed image of the sample using the first backpropagated image and the second backpropagated image.

11. The system of claim 10, wherein the beam includes a first beam associated with the first microlens array and the beam further includes a second beam associate with the second microlens array.

12. The system of claim 10, and further comprising a first objective lens disposed on the first axis and associated with the first plurality of beams, and a second objective lens disposed on the second axis and associated with the second plurality of beams.

13. The system of claim 12, wherein image plane includes a first image plane associated with the first objective lens, and the second image plane includes a second image plane associated with the second objective lens.

14. The system of claim 10, wherein the camera further acquires a background image and wherein the processor and memory perform a tomography reconstruction using the first image, the second image, and the background image.

15. The system of claim 10, wherein the image plane is conjugate to the sample at a sample plane.

16. The system of claim 1, wherein the camera and the light source are located on opposite sides of the sample.

17. The system of claim 1, wherein the first image includes the entire sample for a first angle of illumination, and wherein the second image includes the entire sample for a second angle of illumination.

18. The system of claim 1, wherein the sample is a three-dimensional (3D) sample, and wherein the first image and the second image are projections of the 3D sample onto two-dimensional (2D) planes along different projection angles.

* * * * *